No. 614,292. Patented Nov. 15, 1898.
J. DAVIDSON.
PROCESS OF RENDERING.
(Application filed Nov. 18, 1896.)
(No Model.) 2 Sheets—Sheet 1.
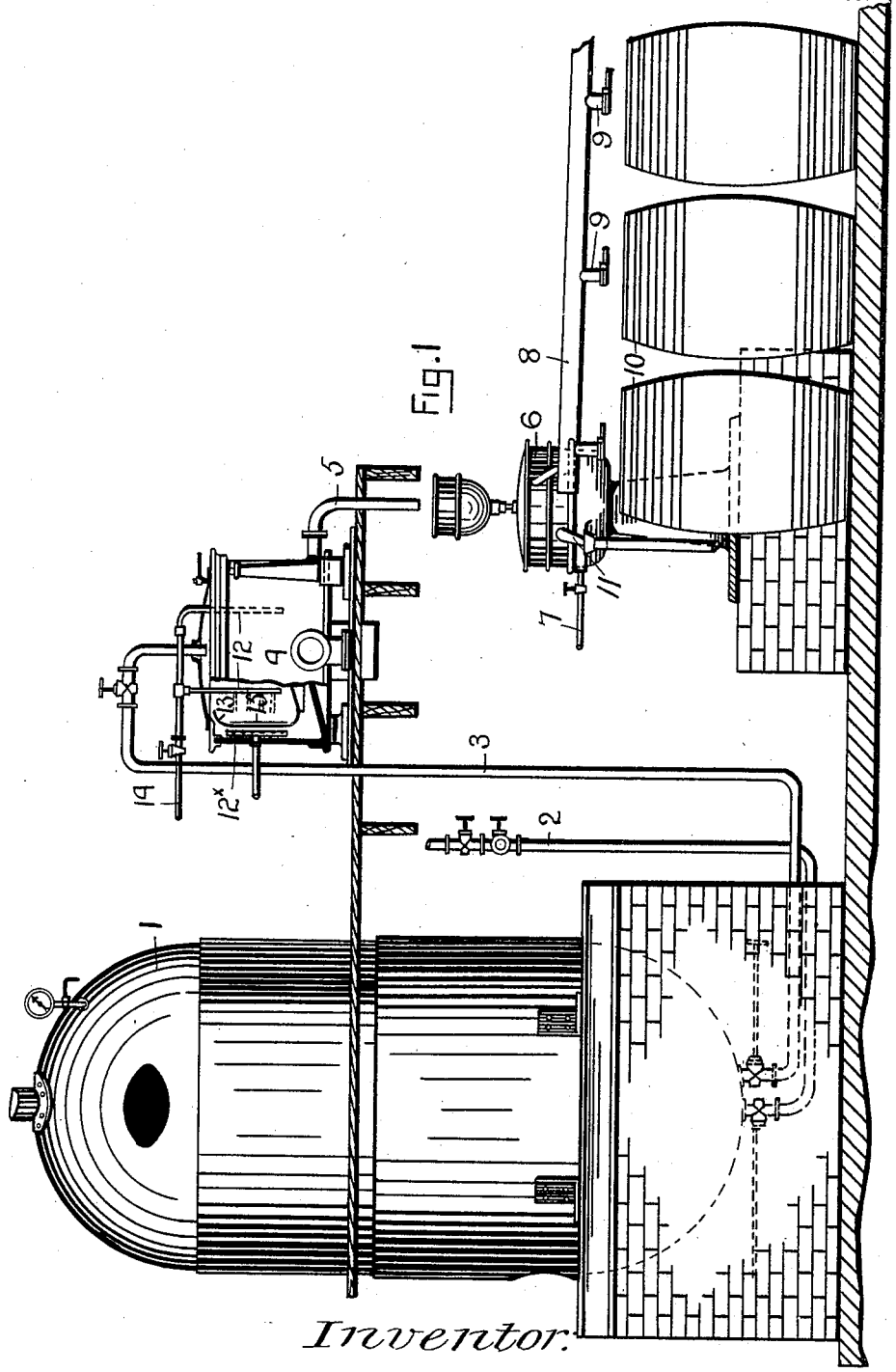
Witnesses:
E. B. Bolton
Otto Munk
Inventor:
James Davidson
By Richard …
his Attorneys.
THE NORRIS PETERS CO., PHOTO-LITHO., WASHINGTON, D. C.

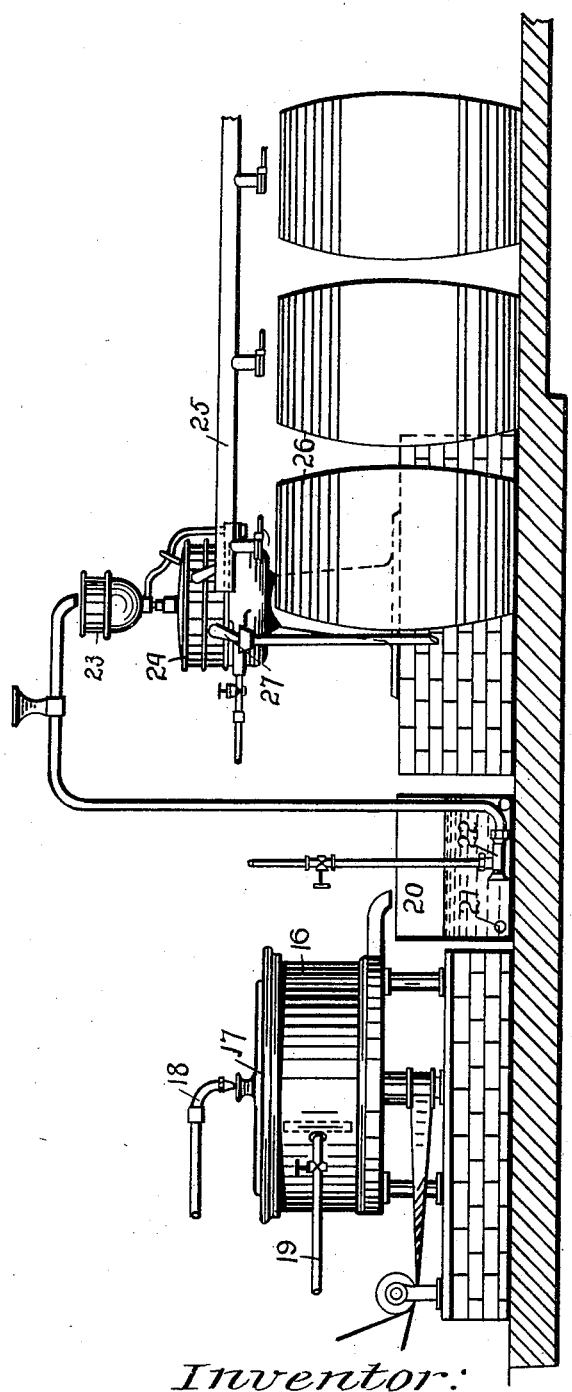

UNITED STATES PATENT OFFICE.

JAMES DAVIDSON, OF SYDNEY, NEW SOUTH WALES.

PROCESS OF RENDERING.

SPECIFICATION forming part of Letters Patent No. 614,292, dated November 15, 1898.

Application filed November 18, 1896. Serial No. 612,570. (No specimens.)

*To all whom it may concern:*

Be it known that I, JAMES DAVIDSON, grain-merchant, a subject of the Queen of Great Britain and Ireland, and a resident of North Sydney, in the Colony of New South Wales, have invented a certain new and useful Improved Process of Extracting Fatty Matter from Certain Fatty Animal Tissues, of which the following is a specification.

The invention has been patented in New South Wales, No. 6,934, dated September 28, 1896; in Victoria, No. 13,544, dated September 30, 1896; in South Australia, No. 3,421, dated October 1, 1896; in New Zealand, No. 8,915, dated October 5, 1896; in Great Britain, No. 25,472, dated November 12, 1896; in Canada, No. 57,956, dated November 2, 1897, and in West Australia, No. 1,324, dated October 9, 1896.

This invention consists of an improved process of extracting fatty matter from suet and other fatty tissues of sheep, cattle, and swine.

In known processes of manufacture of tallow and lard from the substances named there is no provision for extracting from the fats the "soup" and other impurities which are found intermixed with them when they are drawn from the digester. Separate after treatment of the product by washing and rewashing it in water and floating off the fats is sometimes resorted to with the object of effecting purification. The presence of soup and impurities causes the fats to become rancid, and they decompose and produce gases which often burst the casks in which the fats are packed. They make the fats more or less coarse and injure their color, thereby diminishing the value. Some fat is left in the soup, which is usually run to waste. As the process is deficient in these respects, expert labor must be employed to obtain high-grade products and to minimize waste.

The object of my invention is to improve the manufacture of these fats in such a way as to obviate the necessity of employing skilled labor to obtain a maximum of fat and to extract the fat readily and economically and free from mechanically-separable impurities.

The fats produced by the operations hereinafter described are homogeneous, bright in color, and of a high degree of purity.

In the carrying out of my invention either of two methods identical in main principle is adopted. In one a digester is used, and in the other the tissues are not boiled, but rendered in a basket-centrifugal machine.

According to the first method the *modus operandi* is as follows: Fatty tissues of cattle, sheep, or swine are digested under a steam-pressure of thirty to one hundred pounds per square inch for a period of three to six hours (a longer time being sometimes employed in treating swine) until the cellular tissue has been broken up and the fat liberated. As the pressure is increased a shorter time is required to effect the boiling. While pressure is still on the digester, the soup and fat in the liquid form are blown out to be separated and treated. The whole of the soup (which will be blown out first when the digester is discharged through the bottom) may be sent through a basket-centrifugal and a centrifugal separator to insure the abstraction of all the fat, or the bulk of the soup may be run off into tanks or evaporators and treated for the extraction of the gelatin and other valuable contents, if that operation should result profitably; if not, it is run to waste. The last portions of the soup must not be blown out of the digester at this stage. They must be removed with the fat which floats on the surface of the soup and sent through the basket-centrifugal and the separator and the whole mass washed, steamed, strained, and separated.

It is now customary to completely boil out the contents of the digesters used in rendering operations before blowing them down; but I prefer to blow them down during the progress of the boiling. To this end separate steam-supply and blow-down services are provided and both are kept open continuously during the process of boiling, the valves being adjusted so as to allow some liquid to remain always in the bottom of the digester to check the outflow of live steam. The stream of soups and fats discharged through the blow-down service is led into the basket-centrifugal and its product to a centrifugal separator. Thus the fats (as well as the soups) are drawn off as quickly as they are formed, and they are refined and separated while the boiling is progressing, whereby time is economized as well as labor, for immediately after one boiling is finished the digester may be recharged and the whole plant again put in action, and one man can conveniently attend to the digester, the basket-centrifugal, and the separator at one time. This method of operation also offers the very substantial advantages of giving a direct indication of the progress of the rendering, of removing the fats immediately after they are rendered, and so protecting them from the danger of scorching and saving them from being unnecessarily reboiled, and of leaving a minimum of fat held by or mixed with the digested tissues, which not being immersed, as is now the case, readily drain themselves of almost all the fatty substances which are rendered out by heat and do not act as a bed in which said fats are caught and to a great extent held when the digesters are blown down, as at present. When the separator ceases to discharge fat, the boiling need not be continued longer. Steam is then cut off from the digester, which is immediately discharged and recharged, the basket-centrifugal and the separator being in the meantime cleaned, if necessary. The solid product of the boiling, which is removed from the digester, is dried in another basket-centrifugal, by which melted fat and liquid matter is extracted from the bones, meat, fiber, &c. The liquid products are sent to the basket-centrifugal, in which the liquid products of the boiling are treated, and the solid products are manufactured in any known way or are sent to waste. The basket-centrifugals are lined with a close-grained fabric, such as moleskin, which will retain any suspended solid matters and pass liquids. The machines in which the liquid products of the boiling are treated are provided with hot-water and steam services by which hot water or steam under pressure may be blown into the basket and onto its periphery. In practice the basket is speeded up and the hot-water and steam services put in action before the liquid to be treated is blown in. Hot water or steam alone may be used or both alternately. When the other method is adopted—i. e., finishing the boiling of the digester before blowing it down—the first product which will pass into the basket will be soup, next a more or less mixed liquid consisting chiefly of soup and fat, and finally a product consisting almost entirely of fat. The soup, which contains very little fat, pratically all passes through the outer spout of the separator, to which machine it is sent from the basket-centrifugal. After the middle product has been disposed of the separator receives fats with impurities from the basket-centrifugal. The fats are thoroughly hot-washed by hot water or steam or both in the latter machine. They pass from the separator in a pure, bright, and nearly odorless state into a trough or spout, in which cooling takes place. This trough or spout may be provided with a water-jacket to expedite cooling, and it is provided with gates through which the semicooled fat may be allowed to flow into barrels or other packages. The extracted wash-liquor and suspended impurities are run to waste or for further treatment, as before explained, through the outer spout of the separator. It will usually be found that fat will not remain sufficiently fluid to flow freely in the separator. When this is the case, the bowl of the centrifugal should be kept sufficiently warm, by means of steam blown upon it, to maintain the liquid state of the fat.

According to a modification in my invention I obtain fats of similarly high quality from suets or from tissues consisting, chiefly, of suets without a digester. I use this modification also in the retreatment of rancid, discolored, and low-grade fats—bad tallow, for instance—to clarify and sweeten them and to effect an improvement in their color and quality generally. According to this part of the invention suet or suety tissue minced or fats more or less foul or impure are placed in the fabric-lined basket-centrifugal before mentioned and the hot-water and steam services put in action. The fats are speedily rendered, and the liquid fats are at the same time washed and strained, as already described, and are finally extracted in the separator. In dealing with extracted fats, such as bad tallow, an open basket may be used; but when substances such as suet are required to be actually rendered the process will be quickened and rendered more effective by closing the basket in order to keep the temperature within it as high as possible. Speedy loading and unloading may be facilitated by providing convenient appliances for removing, replacing, and fastening the cover and also by providing a bottom discharge and hoppers, spouts, and chutes where necessary.

Very considerable difficulties present themselves in the attempt to apply the separator to the extraction of fats from fatty fluids of the kind herein set forth, and though a certain limited success is obtainable practical results and economy are not obtained unless the machines are adapted to the new use by certain manipulations. Periodically, even when the basket-centrifugal is used, cheesy or slimy substances of bad color form in the bowl of the separator. In time these would become so large as to interfere with the action of the machine, but before this occurs the bowl must be opened and they must be removed. These matters sometimes contain some fat, which may be extracted by remelting them and treating the product in the basket-centrifugal and the separator successively, as already described.

Referring to the annexed explanatory drawings, Figure 1 represents an arrangement of apparatus embodying the invention in its first modification, and Fig. 2 a similar view illustrative of the second modification. In the former, 1 is a digester of the usual form; 2, steam-pipe to digester from boiler; 3, blow-down pipe leading from digester to basket-centrifugal 4; 5, pipe from monitor of 4 to separator 6; 7, steam-pipe; 8, cooking-trough for finished fats; 9, gates therein; 10, barrels; 11, "soup-spout" of centrifugal; 12, perforated pipes depending into the basket 13 of the centrifugal 4; 14, main pipe thereto connected to a source of hot water or steam under pressure, either of which can be turned on at will. 15 is the fabric lining. It lies against the perforated wall of the basket. When desired, pipes 12*, similar to 12, may be fitted outside the basket 13 and arranged to direct jets of hot water or steam onto the periphery of the basket. The area of surface required for effective work in the basket-centrifugal (the construction of which may be identical with that of usual types of hydro-extractors) will depend on the nature of the material used for lining it and upon the temperature of the substances passing through it. When moleskin is used and the temperature approximates to the boiling-point, a basket about thirty inches in diameter is necessary to pass about four hundred gallons of liquid per hour to the best advantage. If canvas be used in place of moleskin, a greater quantity will be passed, but the degree of purification will be inferior.

The separator may be of the ordinary creamer type. A machine of large capacity should be used, as much difficulty is experienced with small machines, owing to the necessity of cleaning them often and the difficulty of that operation due to the clogging of the passages with the cheesy or slimy by-product before mentioned. In carrying out my process in this form of the apparatus the fatty tissues are digested in the digester 1 under a steam-pressure of from thirty to one hundred pounds and while pressure is still on the soup and fat are blown out. The soup at the bottom, which is blown out first, may be sent through a basket-centrifugal and a centrifugal separator to insure the abstraction of all the fat or may be run off into tanks and treated for the abstraction of the gelatin and other valuable contents. The last portion of the soup is not run off with the main body, but is removed with the fat, which floats on the surface of the soup. Boiling is continued during the progress of the blowing down, and the soup and fat are carried to the basket-centrifugal 4 through pipe 3, where they are subjected to the action of hot water or steam, and from the basket-centrifugal the fat, with impurities, is carried to the separator 6, from the spout of which they pass to the trough 8.

Referring to Fig. 2 of the drawings, 16 is the basket-centrifugal. The basket is closed and through a central aperture on the cover 17 passes a pipe 18, similar to the pipes 12. Through this pipe 18 steam or hot water at will may be directed into the rendering mass which is heaped against the walls of the basket. Another steam and hot-water service 19 for operating on the exterior of the basket is connected through an opening in the monitor of the machine. The liquid product of this treatment, consisting, chiefly, of fats and soup, passes into the tank 20, in which there is a steam-coil 21 to maintain the temperature. 22 is a steam-ejector by means of which the liquid in the tank 20 is raised to the funnel 23 of the separator 24. The separator, as in the arrangement previously described, extracts the fats from the soup and foreign matters, the former passing through the trough 25 to the barrels 26 and the latter passing to waste or for further treatment through the spout 27. In this form of the invention I obtain fats from suets or suet-tissues without the use of a digester, the suet or suet-tissues being placed in the basket-centrifugal 16 and the hot-water and steam service pipes put in action to render the mass. The liquid product of this treatment passes to the tank 20 and thence to the separator, as previously described.

Having now particularly described and ascertained the nature of my said invention and in what manner the same is to be performed, I declare that what I claim is—

An improved process of manufacturing fatty matter from fatty tissues of sheep, cattle, or swine consisting in boiling down said tissues, withdrawing the liquid products of such boiling continuously as they are formed during the boiling operation, subjecting said liquid products to action of hot water and steam, and finally treating said liquid products in a centrifugal separator to separate the impurites, substantially as described.

In witness whereof I have hereunto set my hand in presence of two witnesses.

JAMES DAVIDSON.

Witnesses:
C. G. HEPBURN,
W. I. DAVIS.